US008061138B2

(12) United States Patent
Pearson (10) Patent No.: US 8,061,138 B2
(45) Date of Patent: Nov. 22, 2011

(54) SYSTEM FOR CONTROLLING CONTAMINANT DEPOSITION IN EXHAUST GAS RECIRCULATION COOLERS

(75) Inventor: Gavin Pearson, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 820 days.

(21) Appl. No.: 12/145,147

(22) Filed: Jun. 24, 2008

(65) Prior Publication Data

US 2009/0313992 A1 Dec. 24, 2009

(51) Int. Cl.
*F02B 33/44* (2006.01)
*F02M 25/07* (2006.01)

(52) U.S. Cl. .................................. 60/605.2; 123/568.12

(58) Field of Classification Search ................. 60/605.2, 60/599; 123/568.12, 562; *F02M 25/07, F02M 25/06*
See application file for complete search history.

(56) References Cited

U.S. PATENT DOCUMENTS

| 3,211,534 | A | * | 10/1965 | Ridgway | 60/288 |
| 3,214,246 | A | * | 10/1965 | Ridgway | 60/286 |
| 3,819,334 | A | * | 6/1974 | Yoshida et al. | 165/179 |
| 4,487,139 | A | * | 12/1984 | Warner | 165/111 |
| 5,732,688 | A | | 3/1998 | Charlton et al. | 123/568.12 |
| 5,803,162 | A | * | 9/1998 | Karbach et al. | 165/109.1 |
| 6,367,256 | B1 | | 4/2002 | McKee | 60/605.2 |
| 6,460,520 | B1 | * | 10/2002 | Challis | 123/568.12 |
| 7,171,957 | B2 | | 2/2007 | Liu et al. | 123/568.12 |
| 7,469,692 | B2 | * | 12/2008 | Dea et al. | 60/605.2 |
| 2006/0201661 | A1 | | 9/2006 | Sugihara et al. | 165/158 |
| 2007/0028902 | A1 | | 2/2007 | Nigoro et al. | 123/568.12 |
| 2007/0051095 | A1 | | 3/2007 | Lutz | 60/605.2 |
| 2007/0131207 | A1 | | 6/2007 | Nakamura | 60/605.2 |
| 2007/0221181 | A1 | | 9/2007 | Maucher et al. | 123/568.12 |
| 2007/0261400 | A1 | * | 11/2007 | Digele et al. | 60/320 |
| 2008/0028757 | A1 | * | 2/2008 | Eitel et al. | 60/311 |
| 2008/0156472 | A1 | * | 7/2008 | Maucher et al. | 165/166 |
| 2009/0000367 | A1 | * | 1/2009 | Ohata | 60/605.2 |
| 2009/0014151 | A1 | * | 1/2009 | Capelle et al. | 165/44 |
| 2009/0249782 | A1 | * | 10/2009 | Li et al. | 60/605.2 |
| 2009/0260605 | A1 | * | 10/2009 | Janssen et al. | 123/568.12 |
| 2010/0107631 | A1 | * | 5/2010 | Pearson | 60/605.2 |

FOREIGN PATENT DOCUMENTS

EP 0740065 10/1996
WO WO 2010114431 A1 * 10/2010

* cited by examiner

*Primary Examiner* — Thai Ba Trieu
(74) *Attorney, Agent, or Firm* — Diederiks & Whitelaw, PLC (57) ABSTRACT

A system for controlling contaminant deposition in an exhaust recirculation cooler mounted in a vehicle to allow exhaust gas to recirculate along a gas recirculation path from the exhaust assembly of the engine to the intake assembly of the engine. The cooler includes a housing defining an exhaust gas inlet leading to an internal gas cooling passageway which, in turn, leads to an exhaust gas outlet. A controller receives flow dependent signals and, in turn, regulates the flow of exhaust gas through the cooler to establish a turbulent flow in order to control the production of deposits in the cooler. Multiple, varying size coolers can be employed, with separate exhaust flows to the coolers being varied in by determining which coolers should be active, while still maintaining turbulent flow patterns.

21 Claims, 6 Drawing Sheets

SYSTEM FOR CONTROLLING CONTAMINANT DEPOSITION IN EXHAUST GAS RECIRCULATION COOLERS

FIELD OF THE INVENTION

The present invention pertains to the art of exhaust gas recirculation coolers used in association with internal combustion engines having exhaust gas recirculation systems designed to reduce pollution and, more specifically, to controlling contaminant deposition in exhaust gas recirculation coolers.

BACKGROUND OF THE INVENTION

Conventional internal combustion engines produce various pollutants during operation. Generally, most internal combustion engines develop power by burning a hydrocarbon fuel in the presence of air, a mixture of mostly nitrogen and oxygen along with other minor components. During the burning, several exhaust constituents are produced. Some, such as water, are considered rather harmless. Others, such as nitrogen oxides (NOx) are regulated and the production of this pollutant must be controlled. In order to reduce the production of nitrogen oxides, often an exhaust gas recirculation system, hereinafter an EGR system, is provided. In an EGR system, a portion of the exhaust gas from an internal combustion engine is recirculated along a path back into an air intake of the engine. The recirculation of exhaust generally reduces the relative amount of oxygen available for combustion and thus reduces the flame temperature in the engine during combustion. A lower flame temperature greatly reduces the production of nitrogen oxides. Another way to reduce the combustion temperature is to reduce the temperature of the recirculated exhaust. Typically, a cooler is placed in the recirculation path and causes the recirculated exhaust gas to enter the engine at a reduced temperature, thus further reducing the temperature of combustion. Indeed, to reach certain legislative guidelines for emission levels, the exhaust gases must be cooled to some extent.

EGR systems have been used in gasoline engines for at least 30 years and such use is ubiquitous. The use of EGR systems in Diesel engines is more recent. Diesel engines will tolerate more EGR flow than gasoline engines and thus EGR cooling in a Diesel EGR system is important. The coolers in such systems usually have a large heat transfer surface to aid in the transfer of heat from the recirculating exhaust gas to a coolant. Generally, the coolant is introduced behind the heat transfer surface to allow heat to easily pass from the recirculating exhaust gas to the coolant. Unfortunately, during operation of an EGR system, various deposits of soot and other contaminants may accumulate on the heat transfer surface in the cooler and on other conduit portions of the EGR system. The layer of soot will build up in as little as one hundred hours of operation and significantly reduce the ability of the cooler to transfer heat from the recirculating exhaust gas. More specifically, the layer of soot and other contaminants greatly reduces the efficiency of the coolers, thus leading to relatively hot recirculating exhaust gas arriving at the engine intake and reducing the engine's ability to produce power while meeting emissions standards. Such a problem is particularly acute in connection with a Diesel engine.

One approach to this problem has been to employ large coolers. However, the use of large coolers has been considered undesirable because of the high cost and large size. Other approaches have been directed at reducing the amount of deposits. For example, U.S. Patent Application Publication No. 2007/0131207 to Nakamura teaches regulating coolant flow through a cooler based on sensed inlet temperature to reduce deposits. Unfortunately, such a system is based on the principle of increasing the temperature of the recirculating gas. The system is therefore undesirable because it is directly contrary to the concept of reducing the temperature of recirculating exhaust gas to reduce combustion temperature and nitrous oxide production.

Based on the above there is a need in the art for a system designed to control the build up of contaminants in EGR coolers while avoiding the disadvantages set forth above.

SUMMARY OF THE INVENTION

The present invention is directed to a system for controlling contaminant deposition in an exhaust recirculation cooler mounted in a vehicle. In general, the vehicle includes a frame supporting an engine operatively connected to a transmission and wheels so as to drive the wheels and move the vehicle. The system comprises a cooler including a housing defining a gas inlet in communication with a first conduit, as well as a gas outlet in communication with a second conduit and connected to the gas inlet by a gas cooling passageway so as to allow exhaust gas to recirculate along a gas recirculation path from the exhaust assembly of the engine to an air intake assembly of the engine. The system also comprises a coolant outlet connected to a coolant inlet by a passageway to allow coolant to flow through the cooler. The coolant passageway is positioned so as to allow heat from the exhaust gas to pass into the coolant, thus cooling the exhaust gas. A valve is located in the gas recirculation path for controlling a flow rate of the exhaust gas in the cooler and a sensor is mounted for measuring a parameter of the exhaust gas in the gas recirculation path. A controller receives the parameter signals from the sensor and is connected to the valve. More specifically, the controller regulates the opening and closing of the valve in a manner which ensures that the exhaust gas in the cooler flows in a turbulent state in order to remove deposits from the cooler.

Optionally, an additional cooler, including a housing defining a gas inlet in communication with the first conduit and a gas outlet, is placed in communication with the second conduit and connected to the gas inlet by a gas cooling passageway. Additionally, a coolant outlet is connected to an inlet by a passageway to allow coolant to flow through the additional cooler. The coolant passageway is positioned so as to allow heat from the exhaust gas to pass into the coolant, thus cooling the exhaust gas. A master valve may be provided for controlling an overall flow rate through the recirculation path and an additional valve is provided for controlling a flow rate of gas through the additional cooler. The valves are located between the air intake assembly and the coolers or between the air exhaust assembly and the coolers.

The present invention is also directed to a method of controlling contaminant deposition in exhaust gas recirculation coolers. A flow of recirculating exhaust gas is directed from the exhaust assembly of the engine back to the air inlet assembly of the engine so as to reduce the amount of pollutants in the exhaust gas. The control module establishes a flow rate of an exhaust gas in the cooler and receives measurements of various parameters of the exhaust gas. Finally, the control module ensures that the flow rate of the exhaust gas in the cooler is turbulent so as to remove deposits from the cooler. Preferably, multiple coolers are used and the control module directs the flow of exhaust gas through the multiple coolers. Optionally, the module determines the Reynolds number associated with the flow of gas through the cooler and ensures that the Reynolds number stays within a range associated with turbulent flow.

Additional objects, features and advantages of the present invention will become more readily apparent from the following detailed description of preferred embodiments when taken in conjunction with the drawings, wherein like reference numerals refer to corresponding parts in the several views.

DESCRIPTION OF PREFERRED EMBODIMENTS

Figure 1:
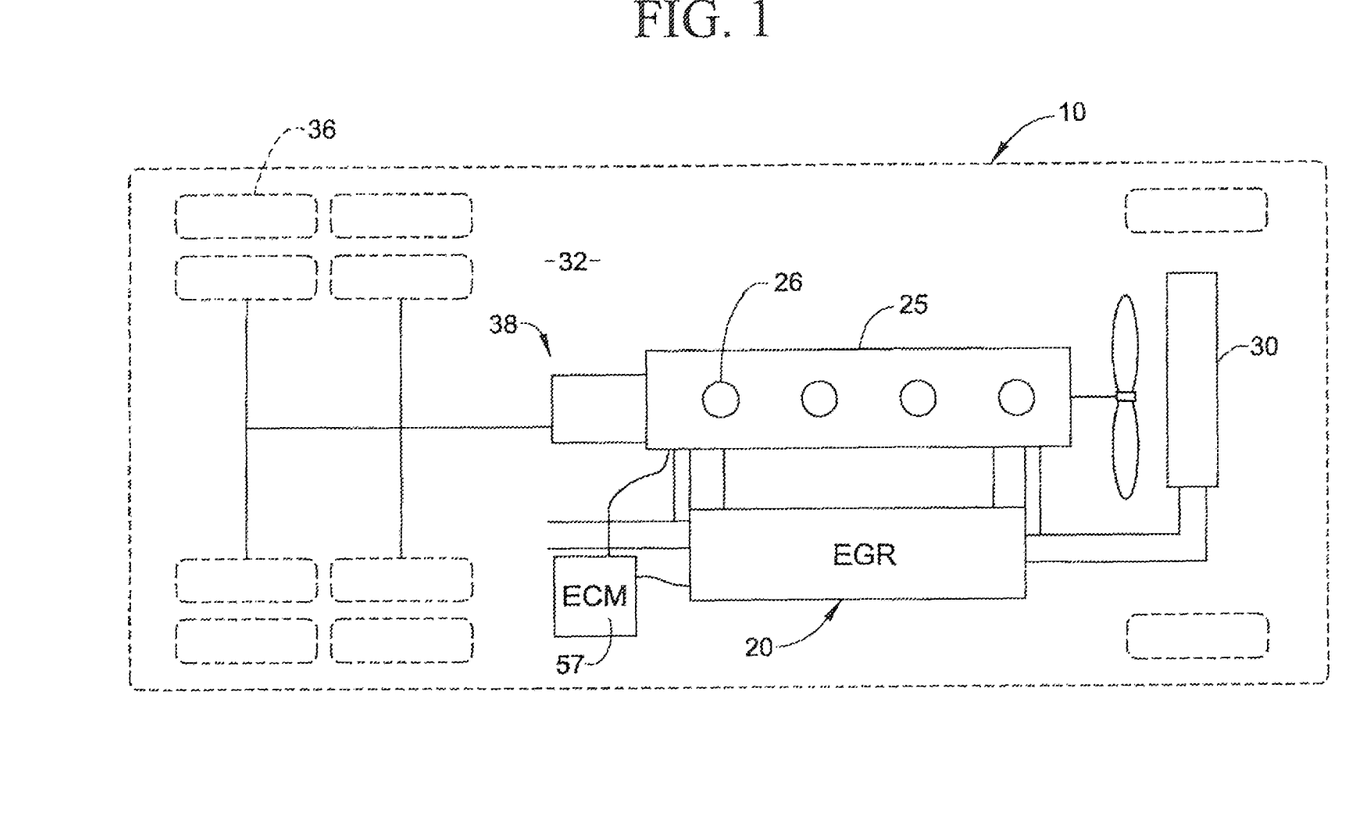
FIG. 1 is a schematic view of a vehicle incorporating a system for controlling contaminant deposition in exhaust gas recirculation coolers embodying the invention.

With initial reference to FIG. 1, there is shown a schematic view of a vehicle 10 incorporating a system 20 for controlling contaminant deposition in an exhaust gas recirculation cooler, as constructed in accordance with a preferred embodiment of the invention. As illustrated, an engine 25 including multiple cylinders 26 is mounted in vehicle 10. Preferably, engine 25 is a Diesel engine and vehicle 10 is a truck. However, vehicle 10 may be any type of vehicle and the system will work with other combustion engines that utilize pollution control devices including exhaust gas recirculation coolers. As shown, radiator 30 is provided to cool engine 25. In addition, vehicle 10 includes a frame 32 which supports various components such as engine 25 used to drive wheels 36 through a powertrain 38 including a transmission and drive shaft (not separately labeled).

Figure 2:
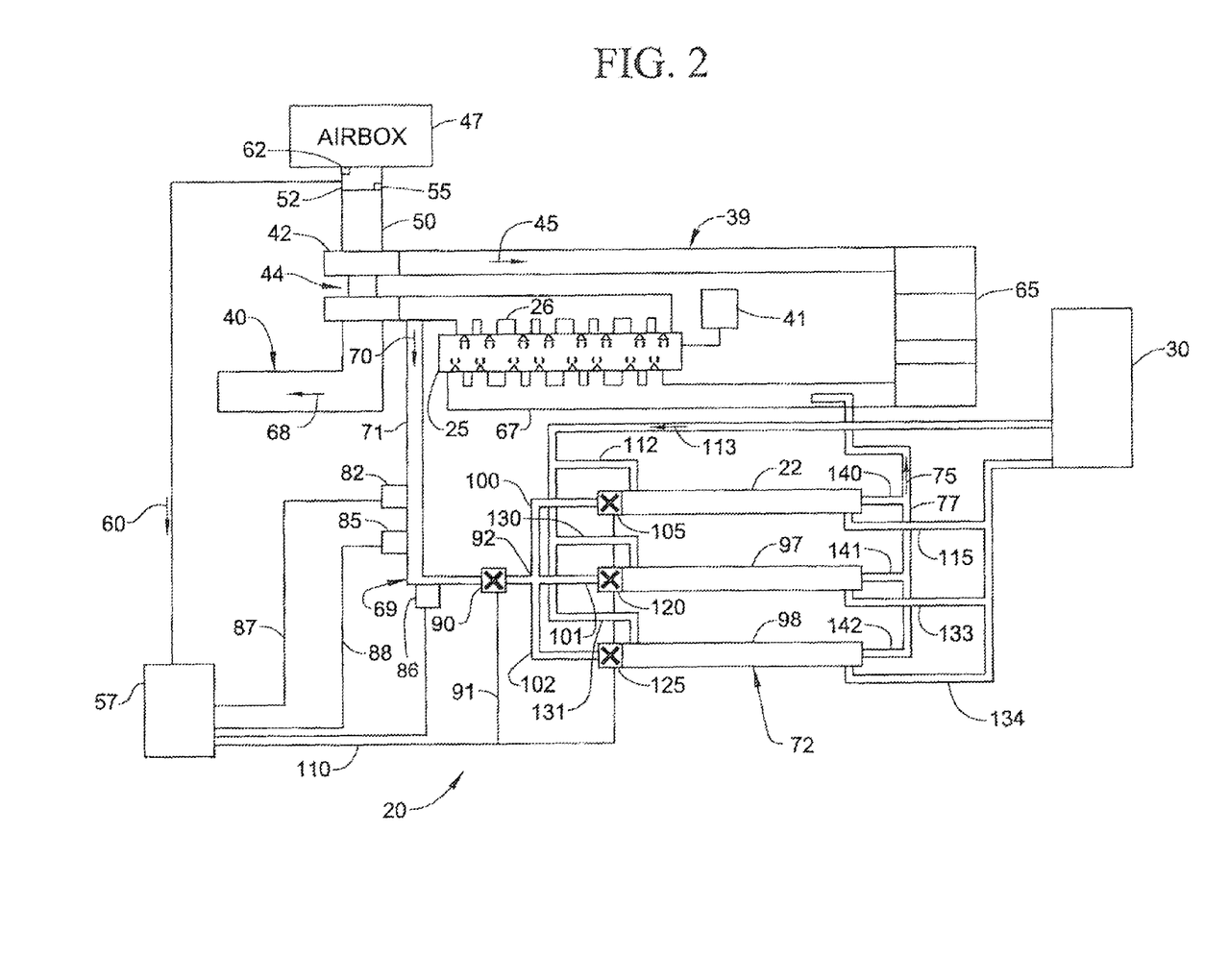
FIG. 2 is a schematic view of the system of FIG. 1 shown in a simplified form with hot side control valves.

As seen in FIG. 2, engine 25 has both an air intake assembly 39 and an exhaust assembly 40. Engine 25 is connected to a source of fuel 41 and a booster 42, such as a turbo charger 44, for increasing a flow of intake air indicated by arrow 45 to engine 25. More specifically air enters system 20 through an airbox 47 and travels through a passage 50 to turbocharger 44. An air mass air flow unit 52 is mounted in passage 50 and includes a sensor 55 for measuring the amount of air passing to turbocharger 44. Sensor 55 is connected to an electronic control module 57. Sensor 55 is able to provide to electronic control module 57 a signal, shown as arrow 60, which is representative of the amount of air passing to turbocharger 44. Additionally, mass airflow unit 52 includes a valve 62 that receives signals from electronic control module 57 and functions to control the amount of air passing therethrough.

In a manner widely known in the art, turbocharger 44 compresses air received from airbox 47 and provides a charge of air which passes through a charge cooler 65. Charge cooler 65 cools the charge and sends the charge to a manifold 67 for distribution to cylinders 26. Engine 25 receives both the charge and fuel which are combusted, thus producing power used to drive vehicle 10 and combustion products which are exhausted from vehicle 10 at exhaust 68.

With continuing reference to FIG. 2, system 20 is shown sending a diverted exhaust flow, i.e., a recirculated exhaust gas (EGR) flow, represented by arrow 70, of exhaust 68 produced by engine 25 through a first conduit 71 to a cooling system 72 and then supplies a cooled portion 75 of diverted exhaust flow 71 through a second conduit 77 to inlet manifold 67, thus completing a gas recirculation path 69 from air exhaust assembly 40 to air intake assembly 39. More specifically, system 20 includes first conduit 71 connected to exhaust assembly 40. First, conduit 71 is preferably equipped with an exhaust backpressure sensor 82 and an exhaust temperature sensor 85, and a mass flow sensor 86 which measure the exhaust backpressure, temperature, and recirculating mass flow respectively. Sensors 82, 85 and 86 are connected to electronic control module 57 by wires 87 and 88, or other known types of communication channels, and thus are able to provide electronic control module 57 with signals representative of the exhaust backpressure and temperature. Optionally, a master control valve 90 is located in first conduit 71 and arranged to restrict the amount of diverted exhaust flow 70 passing therethrough. Master valve 90 is also connected to electronic control module 57 by a wire 91 or other type of communication channel so that control module 57 can control the amount of exhaust that is in diverted exhaust flow 70. First conduit 71 ends at a junction 92 which splits diverted exhaust flow 70 into two or more paths, each path leading to a respective exhaust gas cooler 22, 97 or 98.

As shown there are three coolers 22, 97 and 98, with first cooler 22 connected to a first path 100, second or additional cooler 97 connected to a second path 101 and third cooler 98 connected to a third path 102. However, it is to be understood that the invention will work with varying number of coolers. First or main cooler 22 cools a first portion of diverted exhaust flow 70. A first EGR valve 105 is positioned between first path 100 and first cooler 22. First EGR valve 105 is also in communication with electronic control module 57 through a communication path 110 so that electronic control module 57 can control the amount of diverted exhaust that passes therethrough. A first coolant feed 112 supplies coolant, as represented by arrow 113, to first cooler 22 from radiator 30 and a return feed 115 directs coolant 113 back to radiator 30 such that the coolant travels in a recirculating path. Coolant 113 is used by first cooler 22 to cool diverted exhaust 70.

In a similar manner, a second EGR valve 120 is positioned between second path 101 and second cooler 97; and a third EGR valve 125 is positioned between third path 102 and third cooler 98. Each of second and third EGR valves 120, 125 is also connected to electronic control module 57. In this manner, control module 57 can individually control a flow rate of an amount of diverted exhaust gas 70 passing through each of coolers 22, 97 and 98. Indeed, if no master valve 90 is present, control module 57 may use valves 105, 120, 125 to control the overall amount of diverted flow 70 passing through coolers 22, 47, 98. Likewise, each of the second and third coolers 97, 98 has a respective second and third coolant feed 130, 131 and a respective second and third coolant return 133, 134 attached to radiator 30 for providing recirculating coolant paths so that second and third coolers 97, 98 can use coolant 113 to cool the second and third diverted amounts of exhaust passing therethrough. At this point, it should be understood that electronic control module 57 need not be dedicated for use with the exhaust system, but preferably constitutes a main electronic control unit for vehicle 10 so as to control various engine, transmission and other functions. Also, although a preferred arrangement of sensors has been disclosed, different sensors can be used in combination with electronic control module 57 to indirectly derive the desired measurements. Three coolers are shown by way of example and this embodiment is not intended to be limiting. In alternate embodiments, two coolers are used.

In the embodiment shown in FIG. 2, EGR valves 90, 105, 120 and 125 are shown upstream of EGR coolers 22, 97 and 98. Generally, the diverted exhaust gas passing through EGR valves 90, 105, 120 and 125 will be relatively hot. This arrangement has the advantage of relatively low build up of sludge around EGR valves 90, 105, 120 and 125. However, EGR valves 90, 105, 120 and 125 have to be designed to operate in a relatively hot environment. In an alternative embodiment shown in FIG. 3, corresponding EGR valves 90', 105', 120' and 125' are located downstream of EGR coolers 22, 97 and 98. In this case first, second and third EGR valves 105', 120', and 125' are located between the respective first, second and third coolers 22, 97 and 98 and respective first, second and third return paths 140, 141, 142 which lead to second conduit 77. This alternative embodiment has the advantage of allowing a master valve 90' and the first, second and third EGR valves 105', 120' and 125' to operate in relatively cool conditions. However, the tradeoff is that there is an increased amount of sludge build up. In all other respects, the two embodiments are the same such that a further discussion thereof is not necessary.

Figure 4:
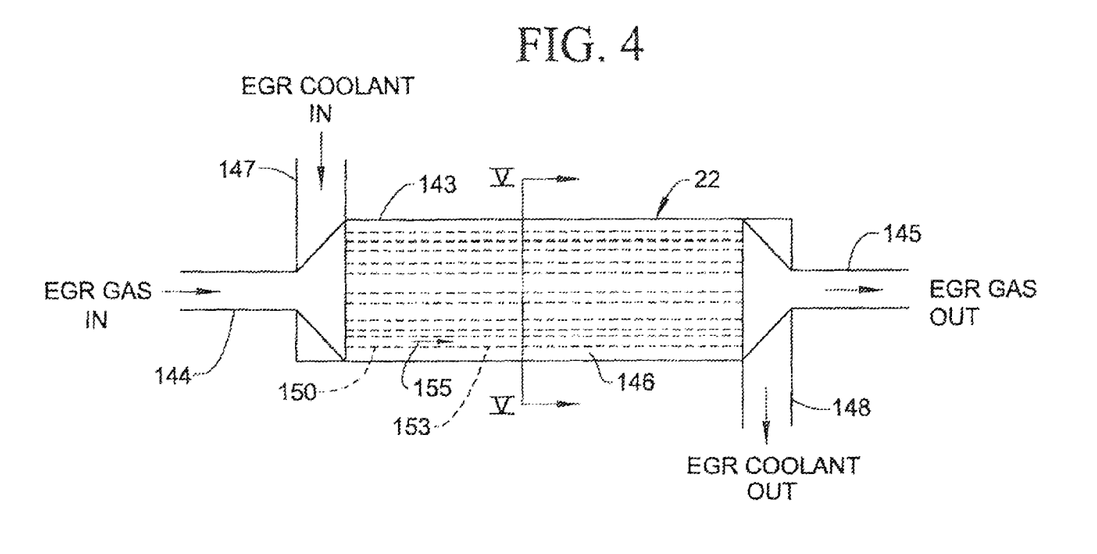
FIG. 4 is a schematic view of one of the coolers in FIG. 1.
Figure 5:
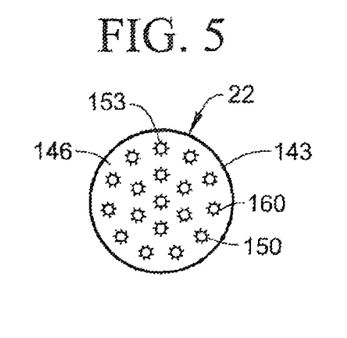
FIG. 5 is a cross-sectional view of the cooler in FIG. 4 taken along the line V-V.

Turning now to FIG. 4, there is shown a more detailed view of first cooler 22. It should be understood that coolers 22, 97 and 98 are preferably constructed to be substantially identical, although the size of each cooler is preferably set based on the needs of engine 25, as more fully discussed below. With this in mind, cooler 22 is shown to include a housing 143 defining a gas inlet 144 in communication with first conduit 71 and a gas outlet 145 in communication with second conduit 72. Housing 143 also defines a gas cooling passageway 146 that connects gas inlet 144 to gas outlet 145. Coolant from first coolant feed 112 enters first cooler 22 at coolant inlet 147 and travels through passages 150 in first cooler 22 to a coolant outlet 148 connected to coolant return feed 115. Passages 150 extend longitudinally and establish a heat transfer surface 153 made from a material that resists damage by corrosive exhaust gases and readily transfers heat from diverted exhaust 70 to a coolant flow indicated at 155. As best seen in FIG. 5, fins 160 preferably extend from passages 150 to further increase heat transfer by enlarging heat transfer surface 153. In another embodiment, the material forming fins 160 and passages 150 establish a texture that increases the turbulence of the flow of diverted exhaust passing around fins 160.

Figure 6:
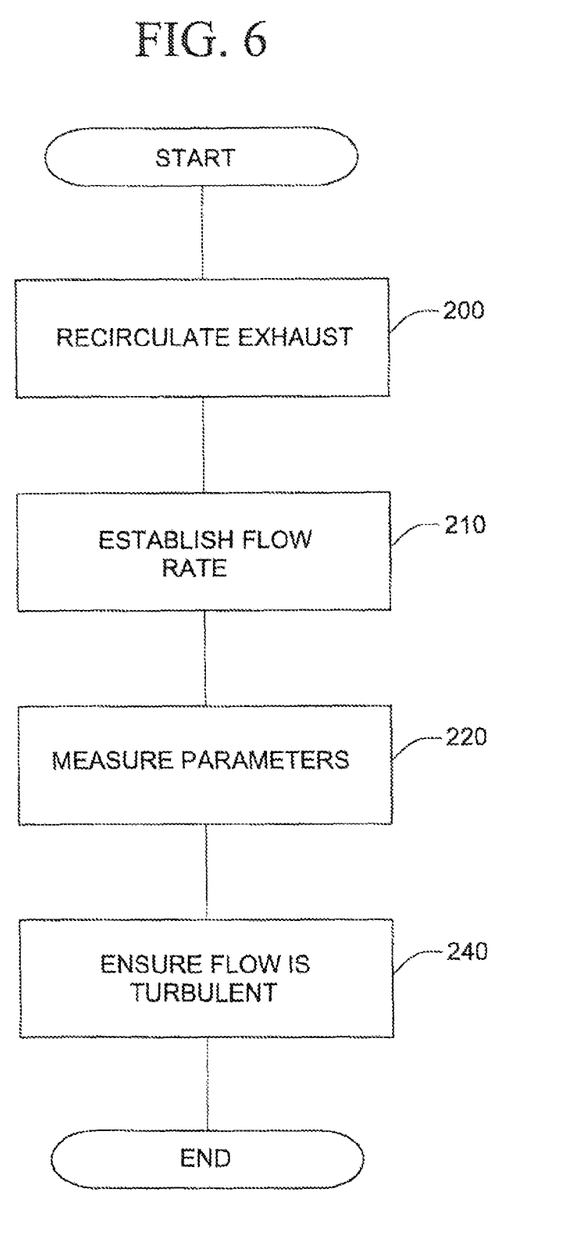
FIG. 6 is flowchart showing a method of operating the system of FIG. 1.

FIG. 6 shows a flowchart indicating the operation of system 20 for controlling contaminant deposition in EGR coolers according to a preferred embodiment of the invention. As shown in step 200, during operation of engine 25, portion 70 of the exhaust flow is diverted from exhaust assembly 40 through first cooler 22 and then recirculated back to air intake assembly 39 along recirculation path 69. As noted above, during engine operation, soot and other deposits may accumulate on the inside surfaces of cooler 22. Cooler fins 160 are particularly prone to collecting soot. If a layer of soot covers fins 160, they will not function properly. To counter this potential problem, as engine 25 starts, a certain flow rate is established through first cooler 22 as shown in step 210. Various parameters, as discussed further below, are then measured in step 220 to calculate if the flow through cooler 22 is laminar or turbulent. Electronic control module 57 then adjusts valves 90, 105 to ensure in step 240 that the exhaust flow through first cooler 22 stays in the turbulent range. A more detailed example of how electric control module 57 ensures the exhaust flow is turbulent is found below in the description of FIG. 7. The advantage of keeping the flow in the turbulent range is that such flow unexpectedly functions to effectively shake off deposits that may have formed on the inside surface of cooler 22 or on fins 160. Once the soot or other deposits are shaken off of cooler 22, the soot travels back through the engine cylinders 26 and is eventually exhausted. Without the layer of soot build up, first cooler 22 operates with a much greater efficiency, thereby allowing the use of a smaller, lighter and cheaper unit than available in the past.

Figure 3:
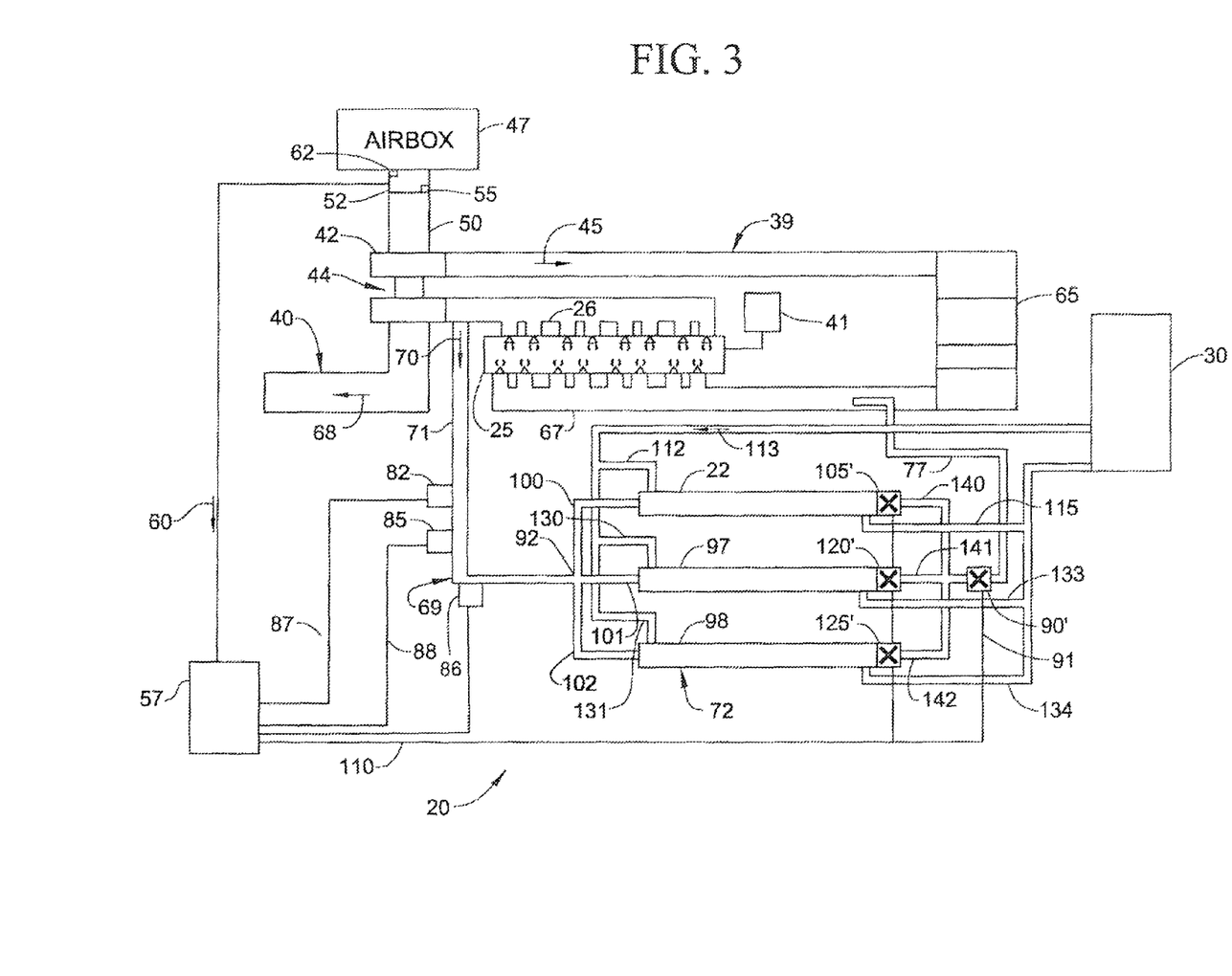
FIG. 3 is a schematic view of the system of FIG. 1 shown in a simplified form with cold side control valves.

One of the parameters that is controlled is the Reynolds number. The Reynolds number is based on, among other things, the speed, temperature, gas mass flow and hydraulic diameter of a passage. As shown in FIGS. 2 and 3, the exhaust backpressure and temperature are measured by sensors 82, 85. Electronic control module 57 calculates the Reynolds number based on the measured parameters and ensures that the flow stays in the turbulent mode by maintaining the Reynolds number in an appropriate range. However, it should be noted that other sensors, e.g. exhaust gas mass flow sensor 86, may be used to obtain the parameters needed to calculate the Reynolds number. Such parameters may also be inferred based on the air flow, fuel injection parameters and other known or measured engine parameters because the performance characteristics of engine 26 may be known. For example, the exhaust backpressure could be inferred based on a measured air inflow and the characteristics of engine 26, instead of measuring the exhaust backpressure directly. The determination of whether a flow through cooler 22 is turbulent or laminar is preferably done by testing to determine what flow rates cause turbulent flow and to produce a look up table for control module 57. Once control module 57 determines what EGR flow is required by engine 25, valve 105 to cooler 22 is adjusted to obtain turbulent flow as much as possible.

The use of multiple coolers 22, 97 and 98 may be required or desirable. In such a case, each cooler 22, 97 and 98 is controlled to run with an optimal Reynolds number so the respective flow is turbulent. For example, the first and second coolers 22, 97 are preferably different sizes, with first cooler 22 being a small cooler and the second cooler 97 being a larger cooler. When engine 26 is running at low speed, small cooler 22 is used. When engine 25 is running at medium speed, large cooler 97 is used and when engine 25 is running at a high speed, both coolers 22, 97 are used. With differently sized coolers 22, 97, a larger range of flow rates can be kept in the turbulent regime as flow 70 passes through the cooler 27, 97. Depending on the particular operating characteristics of the engine, three or more coolers 22, 97 and 98 may be employed. In any is event, when multiple coolers 22, 97 and 98 are used, electronic control unit 57 regulates the flow through the coolers as needed in order to maintain each related Reynolds number in the proper range by opening and closing the appropriate EGR valves 105, 105', 120, 120', 125 and 125'. Again, since controller 57 has more options for flow rates through coolers 22, 97, 98 when multiple coolers are used, the flow through coolers 22, 97, 98 can be kept turbulent over a larger range. Control module 57 determines how many coolers should be used for a given EGR flow rate 70 demanded by engine 25.

Figure 7:
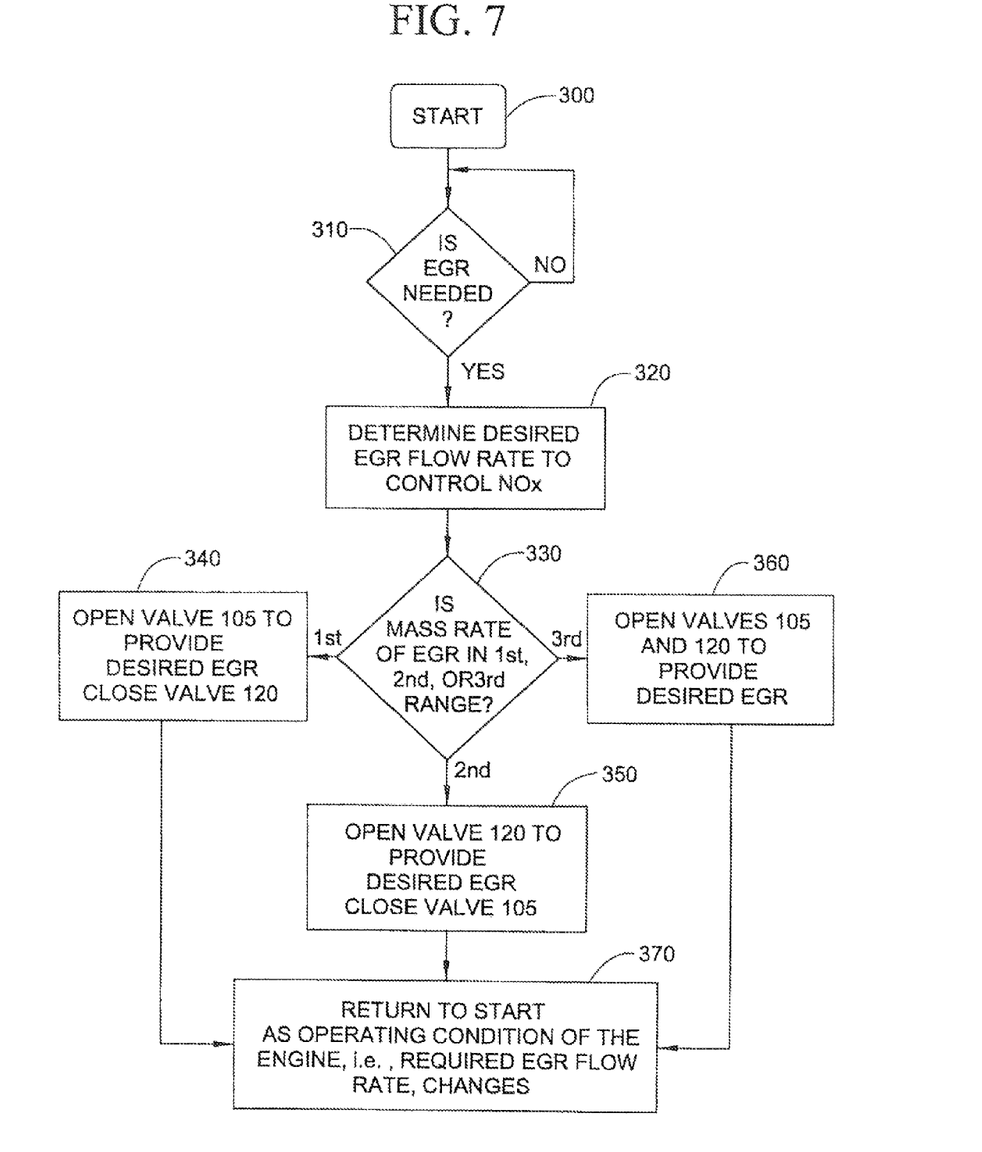
FIG. 7 is a flowchart showing more details of the method in FIG. 6.

Turning now to FIG. 7, there is shown a flow chart depicted an exemplary control logic that may be used by control module 57 for controlling two coolers 22, 97. At step 300, a process starts and initially determines at step 310 whether or not exhaust gas recirculation flow is needed. If EGR flow is needed, control module 57 proceeds to step 320 and determines a desired EGR flow rate which is needed to control the emissions of NOx. Since engine 25 requires different EGR flow rates depending on running conditions, such as vehicle speed, the required flow rate may change. Once the required flow rate is determined, control module 57 at step 330 determines whether the EGR mass flow rate is in either a first, second or third range. If the gas flow is in a relatively low first range, then control module 57 sends a signal to open valve 105 to provide the desired EGR flow for engine 25 and, in addition, to ensure that turbulent flow is present in cooler 22. However, if the mass flow rate is in a second, higher range, then control module 57 opens valve 120 and closes 105 to have EGR flow travel through larger cooler 97 thus providing the desired EGR flow and still ensuring a turbulent flow through cooler 97. If the mass flow rate is in a higher third range, then both valves 105 and 120 are open in step 360 to provide the desired EGR flow cooling and to ensure that turbulent flow exists in both coolers 22 and 97. In any one of the three paths at step 370, the process will return to step 300 if there are changes in the required EGR flow rates. The above discussion of course assumes only two coolers, coolers 22 and 97, are being used. If a third cooler 98 is used, of course the search logic becomes a little bit more complicated in that three valves should be used and a possible six different flow ranges may be provided.

Based on the above, it should be readily apparent that the present invention provides for a system that controls the build up of contaminants in EGR coolers while avoiding the disadvantages as set forth in the prior art. Although described with reference to preferred embodiments of the invention, it should be readily understood that various changes and/or modifications could be made to the invention without departing from the spirit thereof. For instance, numerous additional EGR coolers may be added to the system as needed and the system may be adapted to any engine, with or without a charge booster, that incorporates an EGR system. In general, the invention is only intended to be limited by the scope of the following claims.

The invention claimed is:

1. A method for controlling contaminant deposition in an exhaust gas recirculation system including a gas recirculation circuit having a cooler comprising:
   directing an overall flow of exhaust gas with an overall mass flow rate from an exhaust assembly of an engine through the gas recirculation circuit back to an air inlet assembly of the engine so as to reduce an amount pollutants produced during operation on the engine;
   establishing a mass flow rate of a flow of exhaust gas in the cooler;
   measuring at least one flow parameter of the flow of exhaust gas in the cooler path, said parameter being at least one of exhaust gas mass flow rate, exhaust gas back pressure, exhaust gas pressure, exhaust gas temperature and combinations thereof;
   controlling, based on the at least one flow parameter, the flow of exhaust gas in the cooler to be a turbulent flow; and
   removing deposits from the cooler with the turbulent flow.

2. The method of claim 1, wherein establishing the mass flow rate includes directing the overall flow of exhaust gas through multiple coolers and varying a percentage of the overall flow of exhaust gas between the multiple coolers.

3. The method of claim 2, wherein the coolers have different sizes thereby establishing at least a smaller cooler and a larger cooler, and wherein, during operation of the engine at a slow speed, the overall flow of exhaust gas is only directed through the small cooler and, during operation of the engine at higher speeds, the overall flow of exhaust gas is directed through both the smaller and larger coolers.

4. The method of claim 2, wherein the step of controlling the flow of exhaust gas in the cooler to be turbulent includes measuring the overall flow mass rate of exhaust gas and determining if the overall mass flow rate is in one of a first, second or third range.

5. The method of claim 4, wherein the step of controlling the flow of the exhaust gas includes directing the overall flow through a first cooler if the overall mass flow rate is in the first range, through a second cooler if the overall mass flow rate is in a second range and through both the first and second coolers if the overall mass flow rate is in a third range.

6. The method of claim 1, wherein the step of controlling the flow of exhaust gas in the cooler to be turbulent includes regulating an opening and closing of at least one valve to establish a desired mass flow rate for the flow of exhaust gas.

7. The method of claim 6, wherein the at least one valve controls the mass flow rate at a point upstream of the cooler.

8. The method of claim 6, wherein the at least one valve controls the mass flow rate at a point downstream of the cooler.

9. The method of claim 1, wherein the step of measuring at least one flow parameter includes measuring exhaust pressure.

10. The method of claim 9, wherein the step of measuring at least one flow parameter further includes measuring exhaust temperature.

11. A contaminant deposition controlling system in an exhaust gas recirculation cooler comprising:
    a first conduit connected to an exhaust assembly of an engine;
    a second conduit connected to an air intake assembly of the engine;
    a cooler including a housing defining a gas inlet in communication with the first conduit, a gas outlet in communication with the second conduit and connected to the gas inlet by a gas cooling passageway so as to allow exhaust gas created by the engine to recirculate along a gas recirculation path from the exhaust assembly of the engine to the intake assembly of the engine, a coolant inlet, a coolant outlet connected to the inlet by a coolant passageway to allow coolant to flow through the cooler, the coolant passageway being positioned so as to allow heat from the exhaust gas to pass into the coolant thus cooling the exhaust gas;
    a valve located in the gas recirculation path for controlling a mass flow rate of the exhaust gas in the cooler;
    a sensor for detecting a parameter of the exhaust gas in the recirculation path, said parameter being at least one of exhaust gas mass flow rate, exhaust gas back pressure, exhaust gas pressure, exhaust gas temperature and combinations thereof; and
    a controller connected to the sensor for receiving the parameter and connected to the valve for regulating the opening and closing of the valve based on the parameter, whereby the controller establishes a turbulent flow for the exhaust gas in the cooler and whereby deposits are removed from the cooler by the exhaust gas flowing in a turbulent manner.

12. The system of claim 11, further comprising:
    an additional cooler including a housing defining a gas inlet in communication with the first conduit, a gas outlet in communication with the second conduit and connected to the gas inlet by a gas cooling passageway, a coolant inlet, a coolant outlet connected to the inlet by a coolant passageway to allow coolant to flow through the cooler, the coolant passageway being positioned so as to allow heat from the exhaust gas to pass into the coolant thus cooling the exhaust gas.

13. The system of claim 12, further comprising:
a master valve for controlling an overall mass flow rate through the recirculation path; and
an additional valve for controlling a flow through the additional cooler.

14. The system of claim 13, wherein the master valve is located between the air intake assembly and the coolers.

15. The system of claim 13, wherein the master valve is located between the air exhaust assembly and the coolers.

16. The system of claim 11, wherein the parameter of the exhaust gas is the exhaust gas mass flow rate through the exhaust gas recirculation cooler and the sensor is an exhaust gas mass flow rate sensor.

17. A vehicle comprising a frame supporting an engine having an exhaust gas recirculation system and being operatively connected to a transmission and wheels so as to drive the wheels and move the vehicle, a contaminant deposition controlling system for controlling deposits in an exhaust gas recirculation cooler, said system including:
a first conduit connected to an exhaust gas assembly of the engine;
a second conduit connected to an air intake assembly of the engine;
a cooler including a housing defining a gas inlet in communication with the first conduit, a gas outlet in communication with the second conduit and connected to the gas inlet by a gas cooling passageway so as to allow exhaust gas created by the engine to recirculate along a gas recirculation path from the exhaust assembly of the engine to the intake assembly of the engine, a coolant inlet, a coolant outlet connected to the inlet by a coolant passageway to allow coolant to flow through the cooler, the coolant passageway being positioned so as to allow heat from the exhaust gas to pass into the coolant thus cooling the exhaust gas;
a valve located in the gas recirculation path for controlling a mass flow rate of the exhaust gas in the cooler;
a sensor for detecting a parameter of the exhaust gas in the recirculation path, said parameter being at least one of exhaust gas mass flow rate, exhaust gas back pressure, exhaust gas pressure, exhaust gas temperature and combinations thereof; and
a controller connected to the sensor for receiving the parameter and connected to the valve for regulating the opening and closing of the valve based on the parameter, whereby the controller establishes a turbulent flow for the exhaust gas in the cooler and whereby deposits are removed from the cooler by the exhaust gas flowing in a turbulent manner.

18. The vehicle of claim 17, further comprising:
an additional cooler including a housing defining a gas inlet in communication with the first conduit, a gas outlet in communication with the second conduit and connected to the gas inlet by a gas cooling passageway, a coolant inlet, a coolant outlet connected to the inlet by a coolant passageway to allow coolant to flow through the cooler, the coolant passageway being positioned so as to allow heat from the exhaust gas to pass into the coolant thus cooling the exhaust gas.

19. The vehicle of claim 18, further comprising:
a master valve for controlling an overall mass flow rate through the recirculation path; and
an additional valve for controlling a flow through the additional cooler.

20. The vehicle of claim 19, wherein the master valve is located between the air intake assembly and the coolers.

21. The vehicle of claim 19, wherein the master valve is located between the air exhaust assembly and the coolers.

* * * * *